United States Patent [19]

Soodak et al.

[11] Patent Number: 4,945,203
[45] Date of Patent: Jul. 31, 1990

[54] METHOD AND APPARATUS FOR MAKING FLUOROCARBON FILM PLASTIC BAGS USING A LASER

[75] Inventors: Charles I. Soodak, Silver Spring; Robert R. Ulrich, Eldersburg, both of Md.

[73] Assignee: American Fluoroseal Corporation, Silver Spring, Md.

[21] Appl. No.: 329,836

[22] Filed: Mar. 28, 1989

Related U.S. Application Data

[62] Division of Ser. No. 927,542, Nov. 6, 1986, Pat. No. 4,847,462.

[51] Int. Cl.$^5$ .............................................. B23K 26/00
[52] U.S. Cl. .......................... 219/121.64; 219/121.63; 219/121.72; 219/121.84; 219/121.75; 219/121.77; 219/121.78
[58] Field of Search ............... 219/121.63, 121.64, 219/121.67, 121.72, 121.74, 121.75, 121.6, 121.85

[56] References Cited

U.S. PATENT DOCUMENTS

| | | | |
|---|---|---|---|
| 3,469,076 | 9/1969 | Saslawsky | 219/383 |
| 3,560,291 | 2/1971 | Foglia | 156/229 |
| 3,629,546 | 12/1971 | Fry | 219/121.6 |
| 3,824,368 | 7/1974 | Locke | 219/121.85 |
| 3,974,016 | 8/1976 | Bondybey et al. | 156/272 X |
| 3,981,230 | 9/1976 | Lee | 219/121.63 X |
| 3,989,778 | 11/1976 | Osborne | 264/25 |
| 4,029,535 | 6/1977 | Cannon et al. | 219/121.85 X |
| 4,036,676 | 7/1977 | Pennington | 156/273 |
| 4,065,080 | 1/1978 | Osborne | 219/121.85 X |
| 4,069,080 | 1/1978 | Osborne | 156/272 |
| 4,149,918 | 4/1979 | Aslak | 156/88 |
| 4,158,762 | 6/1979 | Saunders | 219/121.6 |
| 4,160,894 | 7/1979 | Stemmler et al. | 219/121.85 |
| 4,185,185 | 1/1980 | Adlam | 219/121.85 |
| 4,187,408 | 2/1980 | Heile | 219/121.85 |
| 4,219,721 | 8/1980 | Kamen et al. | 219/121.85 |
| 4,237,363 | 12/1980 | Lemelsen | 219/121.85 X |
| 4,350,867 | 9/1982 | Kinoshita et al. | 219/121.63 |
| 4,414,051 | 11/1983 | Bose | 156/198 |
| 4,439,260 | 3/1984 | Cariterino et al. | 156/259 |
| 4,490,203 | 12/1984 | Bose | 156/251 |
| 4,499,361 | 12/1985 | Brinker | 219/121.7 |
| 4,500,382 | 2/1985 | Foster | 156/251 |
| 4,539,059 | 9/1985 | Burger et al. | 156/251 |
| 4,539,463 | 9/1985 | Picciole et al. | 219/121.67 |
| 4,564,736 | 1/1986 | Jones et al. | 219/121.63 X |
| 4,564,739 | 1/1986 | Mattelin | 219/121.68 |
| 4,613,742 | 9/1986 | Nelson et al. | 219/121.67 |
| 4,636,609 | 1/1987 | Nakamata | 219/121.84 |
| 4,680,442 | 7/1987 | Bauer et al. | 219/121.67 |

FOREIGN PATENT DOCUMENTS 0299332 11/1985 Fed. Rep. of Germany .

OTHER PUBLICATIONS

W. M. Steen, Welding Design and Fabrication, Welding Research News, Extra Power for Laser Welds from 6TAW Arcs.

Primary Examiner—C. L. Albritton
Attorney, Agent, or Firm—Roylance, Abrams, Berdo & Goodman

[57] ABSTRACT

Methods and apparatuses for manufacturing air and water tight bags of plastic films such as Teflon or other fluorocarbons including creation of an intimate contacting pair of such films. This film pair can be stored or used in accordance with the other aspects of the invention or otherwise, and has its own utility. A vacuum table holds the film pair while a laser beam under computer control simultaneously cuts and welds the film pair along the path of the laser beam to form the bags.

56 Claims, 7 Drawing Sheets

METHOD AND APPARATUS FOR MAKING FLUOROCARBON FILM PLASTIC BAGS USING A LASER

This is a division of my copending application Ser. No. 927,542 filed Nov. 6, 1986, now U.S. Pat. No. 4,847,462, the entire disclosure of which is hereby incorporated by reference as if here set forth in full.

FIELD OF THE INVENTION

This invention relates to methods and apparatus for manufacturing plastic bags. More in particular, the invention pertains to use of a laser in such manufacturing methods and apparatus in such a way as to cut, weld, or simultaneously cut and weld the plastic films or sheets from which the bags are made. The bags are intended for use in culturing living cells for medical treatment.

Promising new cancer treatments have been developed and are currently undergoing tests. These treatments have been reported in the public press, reference may be had to the March 1986 issue of *Readers Digest*, in the "News From the World of Medicine" column. These new treatments were also reported in *The Washington Post*, the issues of Tuesday, Mar. 25, 1986, at page A5, and of Friday, Sept. 12, 1986 at page A4. These treatments are known as cellular immunotherapy. They were developed at the National Cancer Institute of the National Institutes of Health at Bethesda, Md. One of these methods is currently undergoing evaluation in a multi-patient test being performed at several clinical centers in the U.S.A.

As currently being tested, the therapy utilizes either 100 or 200 liters of tissue culture per patient depending upon where the testing is being performed. This involves the use of sterile, one liter screw top bottles. The apparatus includes motor driven rollers to agitate the cells in their cultures in handling these bottles. Because of the large amount of culture medium and cells involved, and the labor involved in handling these bottles, among other reasons, these treatments are extremely expensive.

The present invention is directed towards the development of a disposable Teflon bag which it is anticipated will substantially reduce the cost of this therapy by replacing the bottles and much of the associated labor.

Cellular immunotherapy will benefit particularly from the use of Teflon as opposed to use with other plastics. A polypropylene bag has the disadvantage of being cloudy in appearance which has a detrimental effect on the living cells in the bag. Teflon, as is known, is permeable to both oxygen and carbon dioxide, which is essential for the continued life and health of the living cells in the bag.

More generally however, the present invention is adaptable for use with any thermoplastic film. Thus, the term "plastic film" as used in the specification and claims herein shall be understood to mean Teflon (which is particularly adapted for use in cell culture applications), "fluorocarbon film" as defined below (which also find use in barrier bags as are used for packing meat and the like), and the lower cost, more common grades of thermoplastic film such as polyethylene and polypropylene and others, which will find general applicability.

"Teflon" is a trademark of DuPont for a group of fluoroplastics including FEP (fluorinated ethylene propylene), TFE (tetrafluoroethylene) and PFA (perfluoroalkoxy). Cell culture bags may be fabricated from any of the above in the form of films composed of single films or laminations of two or more layers of the above plastics.

Teflon films have a biologically inert, non stick surface which is extremely well suited to cell growth.

As used in the specification and claims herein, the term "fluorocarbon film" shall be understood to mean any such film including but not limited to FEP, TFE, and PFA films and laminations thereof whether or not they are produced by DuPont. In addition to the above plastics, this term "fluorocarbon film" shall also include the following grades of material: PVDF, PVF, PCTFE, ETFE, and ECTFE.

Another facet of the versatility of the invention is that bags or other objects can be made using different plastic material for each of the films in order to improve the performance of the finished product. For example, for cell culture bags, one could use one film of a plastic having very high gas permeability even though it might be translucent or even opaque, and another material with poor gas permeability but good transparency as the other film. Such a mixed film pair would produce an excellent cell culture bag.

In the cellular immunotheraply system, sterile growth media is added into a sterile Teflon bag. At a later time, the bag is inoculated with cells. The bag wall material is uniquely well suited to the growth of cell suspension cultures because of its inert, non-stick nature and because it has a high rate of oxygen and carbon dioxide exchange, which facilitates respiration by the cells inside. This eliminates the need for continuous agitation, which must be performed with traditional methods.

A key problem in the manufacture of the large, irregularly shaped Teflon bags of the type needed for cell cultures in cellular immunotherapy is the difficulty of sealing together adjacent sheets of the film to form the bag. Teflon has a very high melting temperature, and it also has a limited temperature range between its softening point and its melting point. Thus, it is difficult and expensive to obtain reliable watertight and airtight sealed bags as are essential for cellular immunotherapy.

Methods that have been used to obtain a seal between sheets of Teflon include combined heat and dielectric energy applied to dies or platens which hold the bag material under pressure. This technique results in an expensive apparatus and process that is difficult to control because Teflon is heated only slightly by dielectric energy. Another method involves making the die or platen out of a very low thermal mass material, and applying pressure to the plastic film while rapidly raising it to the fusing point, and then allowing the film to cool while still under pressure. While this method works, it is difficult to prevent the low mass heating element from distorting when forming large or irregularly shaped bags. In addition, if different shapes for the bag for different types of cell culture work are needed, the cost of repeatedly modifying the dies or platens becomes prohibitive.

The present invention solves all of the above problems in the prior art, and in many of its embodiments provides a simple, economical method of fabricating large, irregularly shaped bags of plastic film without the use of expensive dies.

DESCRIPTION OF THE PRIOR ART

The prior art teaches, in general, cutting and welding of plastic materials simultaneously. However, numerous disadvantages in the prior art are present, all of which are overcome by the present invention.

One disadvantage is that some of the prior art requires use with only very thin films. In order to hold a liter of liquid and permit handling thereof, the invention must work with relatively thick films, on the order of 3 to 10 mil plastic films. Use with such relatively thick films to form durable leak proof and airtight bags is a problem in the prior art solved by the present invention.

Another aspect of the invention has to do with holding the work down while it is being cut and welded. In the prior art, this is most commonly accomplished with the use of complicated and expensive dies or sometimes with the use of adhesives. Neither of these processes are fully satisfactory for the present invention and each has problems overcome by the present invention. As to dies, their often substantial cost is eliminated. As to adhesives, the present invention works with Teflon, and Teflon's non-stick character precludes the use of adhesives for hold down or for any other purpose.

Another problem in the prior art concerns the use of dies. Dies are extremely expensive and require additional apparatus and machinery for their implementation. Further, dies are relatively not flexible as to accommodating different sizes and shapes of bags. The preferred form of the present invention operates without any dies at all. However, in an alternate form of the invention, if high production of one size and shape of bag is desired, or if desired for any other reason, the invention teaching is also amenable to use with conventional dies and bag making technology.

SUMMARY AND ADVANTAGES OF THE INVENTION

It is an object of the present invention to provide new and improved methods and apparatuses for the manufacture of air and water tight bags composed of two layers of plastic film which are simultaneously welded together along mating edges and trimmed with smooth edges.

Another object of the present invention is to provide a new and improved method and apparatus for the manufacture of a cell culture bag or the like for biomedical use, fabricated from Teflon films having thickness on the order of 0.001 inch to 0.10 inch in which the welds are of maximum strength and the edges of the finished articles are smooth and free of burrs.

A further object of the invention is to provide a new and improved process and apparatus for manufacturing cell culture bags in which the bags can be large and strong, yet dies are not required for their manufacture, and the process is simple and economical.

Still another object of the invention is to provide method and apparatus of the character described wherein the two films of Teflon are brought together in such a manner that their inner facing surfaces remain sterile and/or clean in all future processing and uses, and wherein the two films once mated together in accordance with the teachings of the invention may be handled, in effect, as a single film. This is accomplished by utilizing heat and pressure to bring the two films into intimate contact with each other to accomplish these purposes, and to do so before the simultaneous cutting and welding step to form the bag itself from the so mated films or film pair.

Another object of the invention is to provide improved laser cutting and welding equipment having the ability to create a first zone of intense laser energy to perform the cutting, and an annular surrounding zone of less intense energy to perform the welding on either side of the cut line. In addition, the apparatus includes shutter means which are manually and selectively usable to permit welding only without the cutting or cutting only without welding.

In another embodiment, a laser is used for welding only, or cutting only, or welding and cutting. Apparatus is provided for use with such a laser beam to cause the laser to follow along the edge of the work and form a weld so that waste of material is reduced to zero at that edge of the finished product. In another embodiment, two lasers work in tandem, one cutting and one welding, which lends substantial additional versatility to the invention.

The welding zone may be shifted to the side of the work by mounting a lens on a wedge to offset the laser beam. The weld line may be maintained on the edge of the work by rotating the wedge under control of the same computer which determines the bag shape. Waste of the relatively expensive Teflon can be minimized by so locating the weld line the edge of the material. A line of cut to smooth the edge of the finished product can be controlled the same way.

The apparatus of the invention further includes a dust free enclosure and arrangement of parts to facilitate continuous production of the mated together films or film pair in preparation for subsequent cutting and welding operations to produce bags.

A further object of the invention is to provide apparatus for carrying out the methods which can be easily adapted to the use of dies, to thus facilitate use of the invention teaching together with conventional die based bag making technology.

Further advantages can be obtained when the methods of the invention are used together with a heated platen. The problem to which this facet of the invention is directed has to do with the distortion and shrinkage that normally occurs upon cooling. As is known, some plastics have a higher rate of shrinkage when heat is applied than others. Further, it appears that the shrinkage problem is aggravated with increasing thicknesses of the films.

The use of helium gas blown onto the welded area reduces the surface temperature in the weld zone. This reduction in temperature allows more uniform heating through the thickness of the material facilitating the welding of thicker materials and the use of higher speeds of feed of the material with respect to the laser beam.

However, an advantage of the invention, in its preferred form, is the avoidance of the use of dies. A conventional vacuum table can be used to hold the mated pair of films, and the laser beam is caused to move relative to the film on the vacuum table to perform the simultaneous cutting and welding operations. This relative motion can be achieved as desired, that is by motion of the table with respect to a stationary laser, motion of the laser with respect to a stationary table, or both kinds of motion simultaneously or in any combination. Conventional computer control technology and means, analogous to that used with numerically controlled machine tools, can be used to control the motion of one or both of the laser or the table or other means holding the work.

This computer control provides further advantages to the invention by providing substantial flexibility. For example, if experimental work is being done which requires many different sizes and shapes of bags, such alternate sizes and shapes of bags can be easily produced by simply reprogramming the cutting equipment, i.e. by changing the programming to control the motion of the laser or the work table or both of them as needed to easily produce as many such alternate sizes and shapes of bags as may be needed.

Yet another advantage of the invention has to do with flexibility in manufacture flowing from the production of the mated films in a first step. Once a film pair is so created, it can be subsequently stored, shipped, and handled as required. This permits decentralization of manufacture, that is, the two separate films can be made into a film pair at one location, and then shipped to different bag manufacturers who might not have or need the film mating equipment but have access to bag making equipment only. They could then use the mated film pair as they would single sheet raw material in their conventional bag making equipment or with numerically controlled machinery, or the like. This advantage is particularly important in the medical area where sterility and cleanliness are vital considerations, since the bag maker does not really at any time handle the inside facing surfaces of the bag which will be in contact with the culture media.

An additional feature of the invention when used without dies is that indicia such as a serial or lot number can be fused into the films during the manufacture of the bags by appropriately programming the computer which controls the movement of the laser beam or the movement of the workpiece with respect to the laser beam. The marking of the bag is done in an area outside of the watertight seam. Such an area or flap can also be used to suspend the bag during subsequent filling and draining of the bag in use.

Thus, there is provided methods and apparatuses of the character described which are highly reliable in use, relatively inexpensive and practical to a high degree, which accomplish all of their objects and provide a substantial step forward as compared to the prior art, and which are generally highly suitable for their intended uses.

BRIEF DESCRIPTION OF THE DRAWING

The invention will now be described in detail, reference being had to the accompanying drawing also forming a part of this disclosure, wherein.

DETAILED DESCRIPTION OF THE PREFERRED EMBODIMENTS

Figure 1:
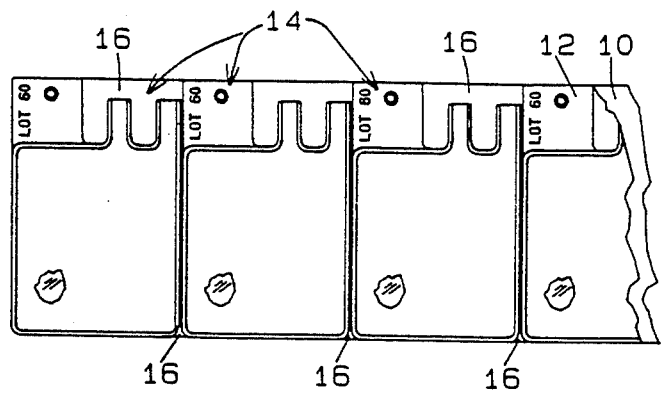
FIG. 1 illustrates the manner in which a plurality of bags could be manufactured from a single mated pair of plastic film in accordance with the invention.
Figure 2:
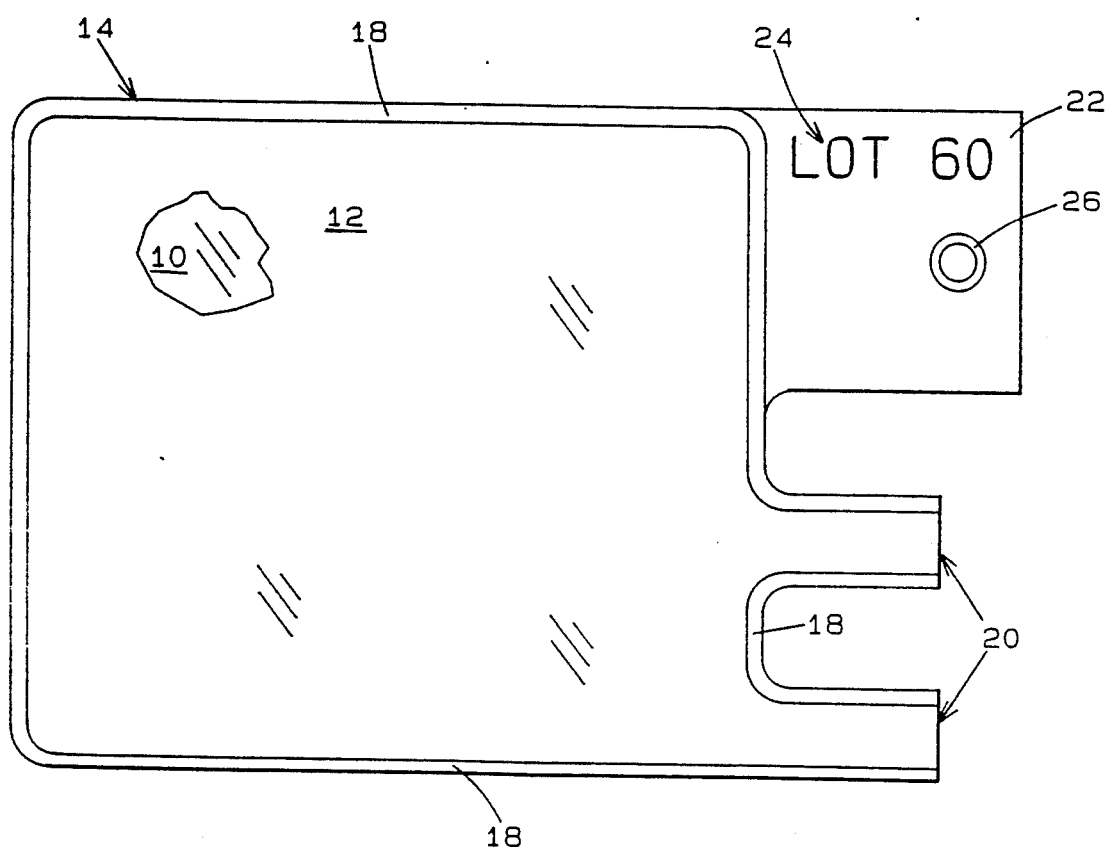
FIG. 2 is a more detailed plan view of one such bag after manufacture.

FIGS. 1 and 2 show a pair of films 10 and 12 which can be paired together in accordance with the invention or otherwise, and then cut and welded to form a plurality of bags 14. FIG. 1 illustrates how a plurality of bags can be efficiently cut from a single continuous mated pair of the films 10 and 12, the cuts across the width of the film serving to simultaneously create smooth, cut and welded seams on two adjacent bags 14. Of course, the width of the films 10 and 12 is selected to equal the length of the finished bags. The waste material 16 is cut away to produce finished bags 14, one of which is shown more in detail in FIG. 2.

Of course, in the event the bags 14 are particularly long, or for any other reason it might be an advantage to arrange the bags on the film end-to-end with respect to each other. In that case, a single pass of the laser will separate the bags at their end edges rather than at their side edges as is shown in FIG. 1.

Referring to FIG. 2, seams 18 define the water tight bag. A pair of openings 20 are provided at one end so that the bag 14 can be used in conjunction with cellular immunotherapy, or for any other biomedical or other usage for the bags manufactured in accordance with the teachings of the invention.

Because of the precise computer-numerical control used in manufacturing the bags in accordance with the invention, the welding only facet of the invention can be utilized in a tab area 22 to add indicia such as the lot number 24, "LOT 60", illustrated. Both the cutting and welding facility can be utilized as shown at 26 to create a reinforced opening separate from the sealed bag area which can be used to conveniently hang or otherwise handle the bags 14.

Figure 3:
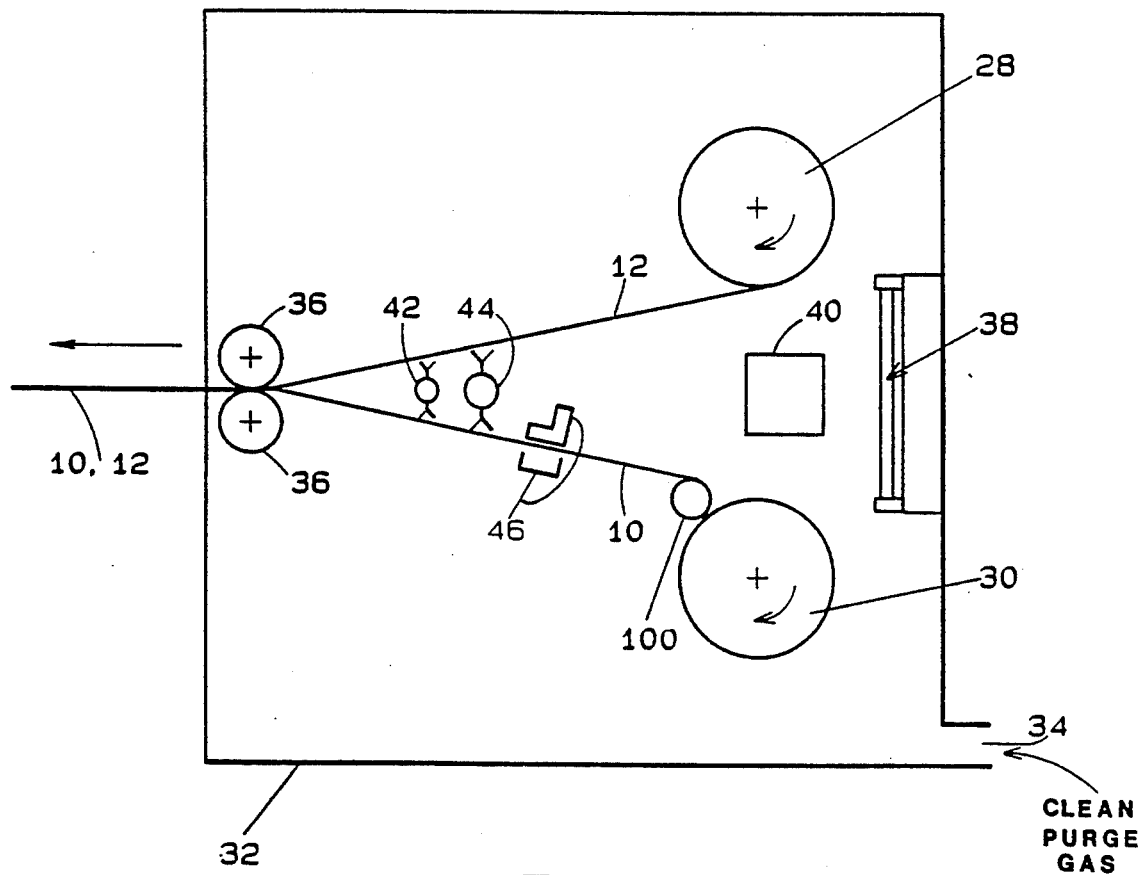
FIG. 3 is a schematic illustration of the apparatus utilized to make the mated film pair.

Referring now to FIG. 3, the manner in which the mated pair of films 10 and 12 are created is shown by way of the apparatus used to perform this function. A pair of spools 28 and 30 containing the upper and lower films 12 and 10, respectively, are provided. The entire mating of the films operation is carried on in a box or other enclosure 28 which can be kept sterile and is kept clean and dust free by a constant flow of clean purge gas which flows in through an inlet 34. The purge gas may be air or nitrogen or other gas as is suitable for the particular embodiment of the invention.

Film manufacturers sometimes instruct users to apply the inner surfaces of the films to the contents of the bag, as when such inner surfaces are specially treated or laminated. However, sometimes the plastic films are the same on both sides. FIG. 3 illustrates this facet of the versatility of the invention in that the upper spool is being unwound with the outer surface of the film going to the inside of the film pair, and the lower spool 30 is being unwound with the inside surface of the film to the inside of the film pair. This is accomplished by the extra roller 100 used in conjunction with the spool 30. Obviously, all combinations of the inner and outer surfaces of the films on the two spools 28 and 30 can be utilized in this manner.

The films 12 and 10 pass through a pair of heated rollers 36 wherein the pairing or intimate contacting of the two films is created. Alternatively, one of the rolls 36 could be a heated platen. Other such apparatuses to accomplish a simultaneous application of heat and pressure to a predetermined degree to the films 12 and 10 to make the mated pair will be evident to those skilled in these arts. These means are provided to achieve "optical contact", as defined below, between the films 12 and 10 to assure that the contacting interface between them remains clean and in good condition for welding.

Enclosure 32 includes germicidal lamps or the like means to prevent mold growth and to kill all of the bacteria inside the box 32. A static electricity neutralizer 40 is also provided to assure intimate contact between the films.

Cleanliness and intimate "optical contact" is also assured by an array of apparatus including a rinse water applicator or sprayer 44, an air knife or other blower type means 42 to remove the water from the thus cleaned films, and suction water collection means 46. Any residual water will, of course, be squeezed backwards towards the collection means 46 by the heated pressure rollers or the like means 36.

The water sprayer and collection means 44 and 46 may not be required under certain circumstances, that is when using certain films or when the film pair is to be used in certain applications. It may be that sweeping with the air blast or air knife means 42 alone will be sufficient under such circumstances. Thus, the means 44 and 46 are considered an optional feature of the invention.

"Optical contact" is defined as a condition in which the two sheets or films are touching over their entire facing surfaces and form a clear, reflection free interface which is invisible when looking through the films. In the case of FEP films, it is necessary to heat one (or both) of the films to about 200 degrees F., to render them soft, limp, and pliable in order to achieve the above condition. After optical contact is achieved, it is no longer necessary to maintain heating, and the film pair can be cut to a convenient size or stored indefinitely without loss of optical contact and with minimal danger of contamination of the interior facing surfaces. In effect, a film pair in "optical contact" can be handled like a single film in subsequent processing, which is an enormous advantage for the invention over the prior art. The length of time a film pair remains in "optical contact" depends upon the films, their thicknesses, compositions, and other factors.

Optical contact can be achieved by the use of vacuum or by stretching the upper and lower films over a platen or the like. While such optical contact is adequate for welding by use of a laser, the films may separate from each other soon after the external forces are removed. Therefore, such a film pair may not be able to be handled as one film or stored in the mated condition without the dangers of relative motion between the films and the introduction of contamination.

Figure 4:
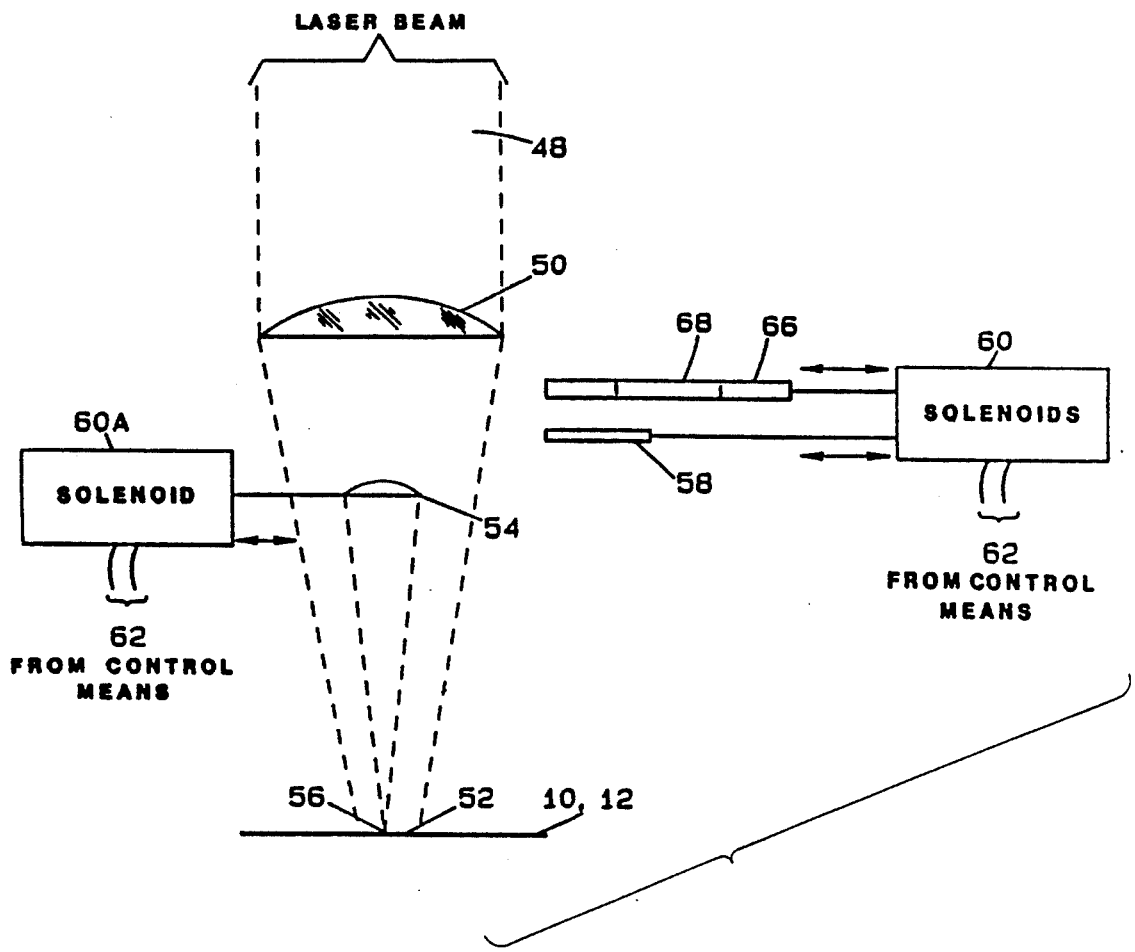
FIG. 4 is a schematic view illustrating use of the laser including a manner in which the laser beam can be used to simultaneously cut and weld, all in accordance with the invention.

FIG. 4 shows somewhat schematically the manner in which a laser is used in accordance with the invention to cut and weld simultaneously, or to cut only or to weld only. The beam 48 from a laser suitable for use in the invention impinges upon a first converging lens 50. The invention operates with any suitable conventional laser, however, for working with Teflon bags, a $CO_2$ laser is preferred. It has been found that its energy at the wave length of 10.6 microns has a particular affinity for Teflon and works particularly well. Other lasers have been tried but have been found not to work as well as the carbon dioxide laser.

The lens 50 is positioned at a distance from the film pair 10/12 less than its focal length. Thus, the laser energy in the beam 48 passing through the lens 50 will form a partially focussed area 52 on the film pair 10/12. A second converging lens 54 is placed centrally within the beam 48 after it exits the first lens 50 so that the laser energy passing through both lenses 50 and 54 will be focussed to a sharp point 56 within the larger area 52. A shutter 58 controlled by a solenoid 60 is provided to either obstruct or permit laser energy from lens 50 from impinging upon lens 54 to thereby create or prevent the creation of the intense cutting spot 56. A pair of leads 62 extend to control means which are also used to control the motion of the spot 56 with respect to the film pair 10/12, as described more in detail below in conjunction with FIG. 8.

Thus, to weld and not cut, one merely needs to position the shutter 58 in the path of the laser beam 48 blocking access to the lens 54. Alternatively, the lens 54 can be simply removed from the optical path as indicated by the solenoid 60A which operates in a manner identical to that of solenoid means 60 described below.

To cut and weld simultaneously, the parts should be positioned as shown in FIG. 4 with the shutter 58 out of the path of the laser beam.

The invention also has the ability to cut and not weld. To this end, the block 60 includes at least two separate solenoid means, one of which drives the shutter 58 as described above, and the second one of which drives an apertured disk 66 which can be selectively placed between the lenses 50 and 54. The aperture 68 in this disk 66 has a predetermined diameter such that the laser energy passing through the lens 50 which would normally impinge upon the lens 54 is permitted to pass through the opening 68, and all of the remaining laser energy passing through the lens 50 is blocked. In this manner the apertured disc 66, when placed in the path of the laser beam 48, will permit cutting by the energy passing through the lens 54, but not any welding on either side of the cut. That is, the large annular spot 52 is effectively cut off by the apertured disk 66.

Thus, it can be seen that by the use of the solenoid means in block 60, one or the other of the apertured disk 66 or the shutter 58 can be inserted into the path of the laser beam 48 between the lenses 50 and 54. Insertion of the apertured disk 66 will have the effect of cutting off the welding annular ring 52. Insertion of the shutter 58 will have the effect of cutting off the cutting spot 56. In this manner the invention apparatus can be used to cut and weld simultaneously, to weld and not cut, or to cut and not weld, selectively at the desire of the user. A similar manner of operation of lens 54 is provided by solenoid 60A, as described above.

Figure 5:
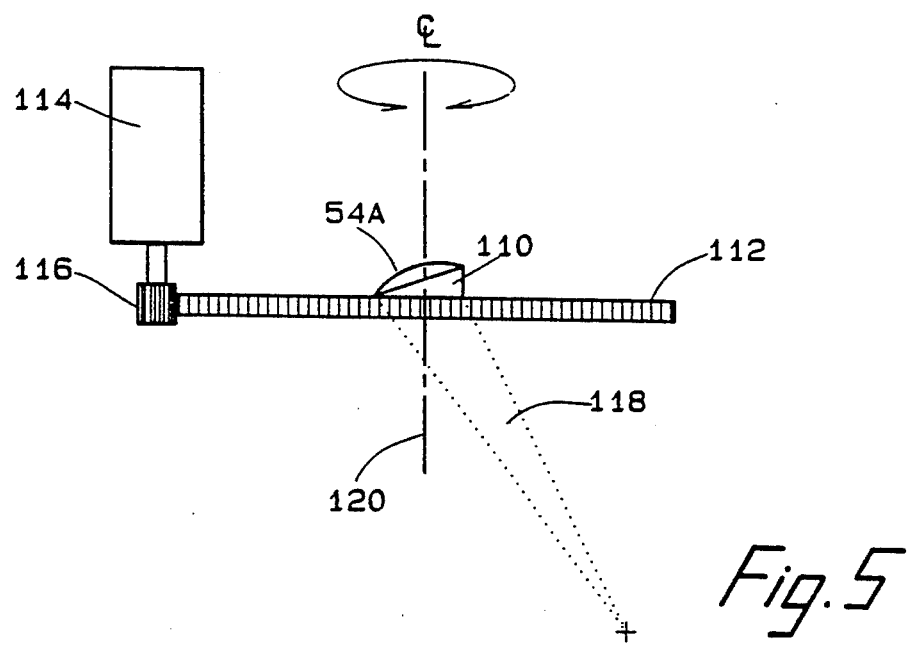
FIG. 5 is a schematic showing of means to rotate the laser cutting beam which can be used in the apparatus of FIG. 4.

As shown in FIG. 5, means are provided to optionally offset the beam to the edge of the material to thus minimize the waste. That is, by welding right at the edge of the material, the waste at that location can be reduced to zero. This is particular important when working with relatively expensive materials such as Teflon.

Referring now to FIG. 5, the lens 54A, which can otherwise be identical to lens 54 of FIG. 4, is mounted on an optical wedge 110 which is in turn mounted on a round window 112. A control motor 114 has a pinion 116 at the outer end of its shaft which cooperates with the edge of the window 112 which is knurled or provided with teeth to cooperate with the teeth on pinion 116. The control motor 114 can thus control the angular position of the wedge and lens combination 110 and 54A to thus direct the beam 118 as needed. The amount of offset shown in FIG. 5 is exaggerated for the sake of clarity. The assemblage of the parts 54A and 110 rotate about the centerline 120.

Figure 6:
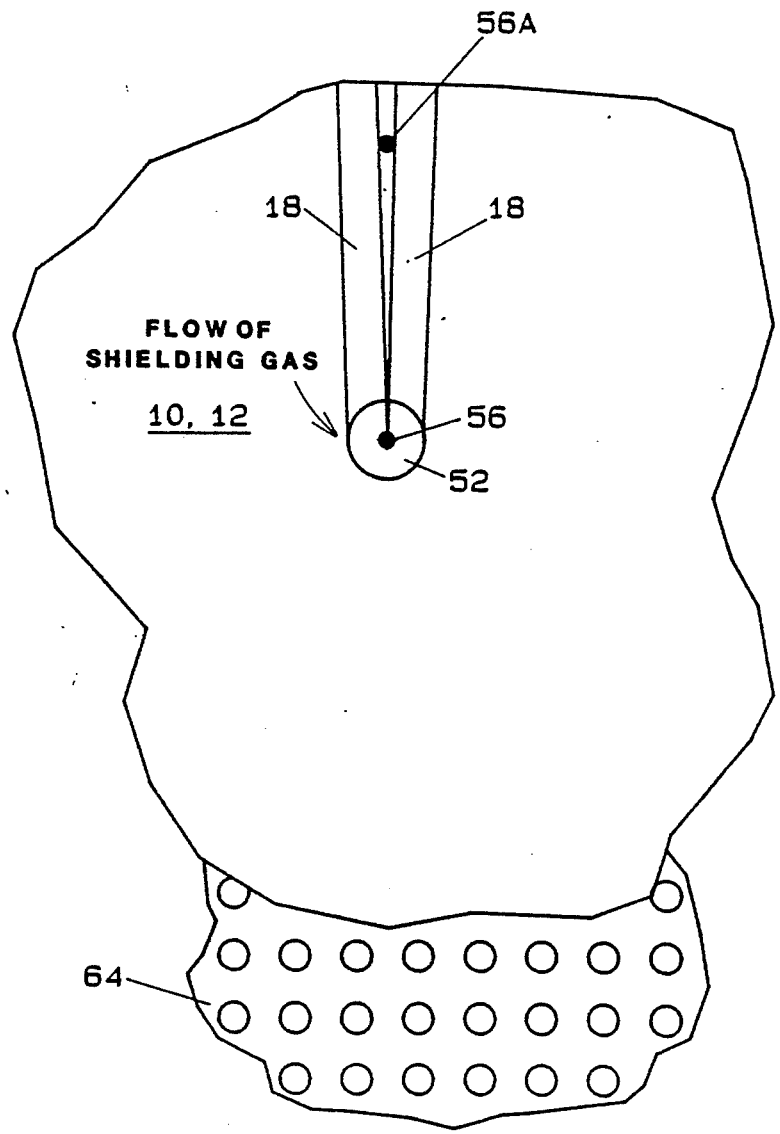
FIG. 6 is a plan view showing two ways in which the films can be simultaneously cut and welded in accordance with the invention.

FIG. 6 illustrates the manner in which a seam, such as one of the vertical seams shown in FIG. 1 between two bags, can be made using the apparatus of FIG. 4. Preferably, a vacuum table 64, available from conventional technology, is provided to hold the mated pair of films 10/12 which are in optical contact with each other in position for cutting and/or welding. The composite spot 52, 56 moves with respect to the work 10/12 to create the cut and the two adjacent seams 18 as shown and as described above.

It is an important advantage of the invention that means can be provided to move the laser beam and hence the spots 52 and 56 with respect to the table 64 with the work thereon, or the table can move with respect to a stationary laser, or combination motions are possible. The choice will often depend upon the kind of equipment available to the user of the invention's teachings.

Figure 8:
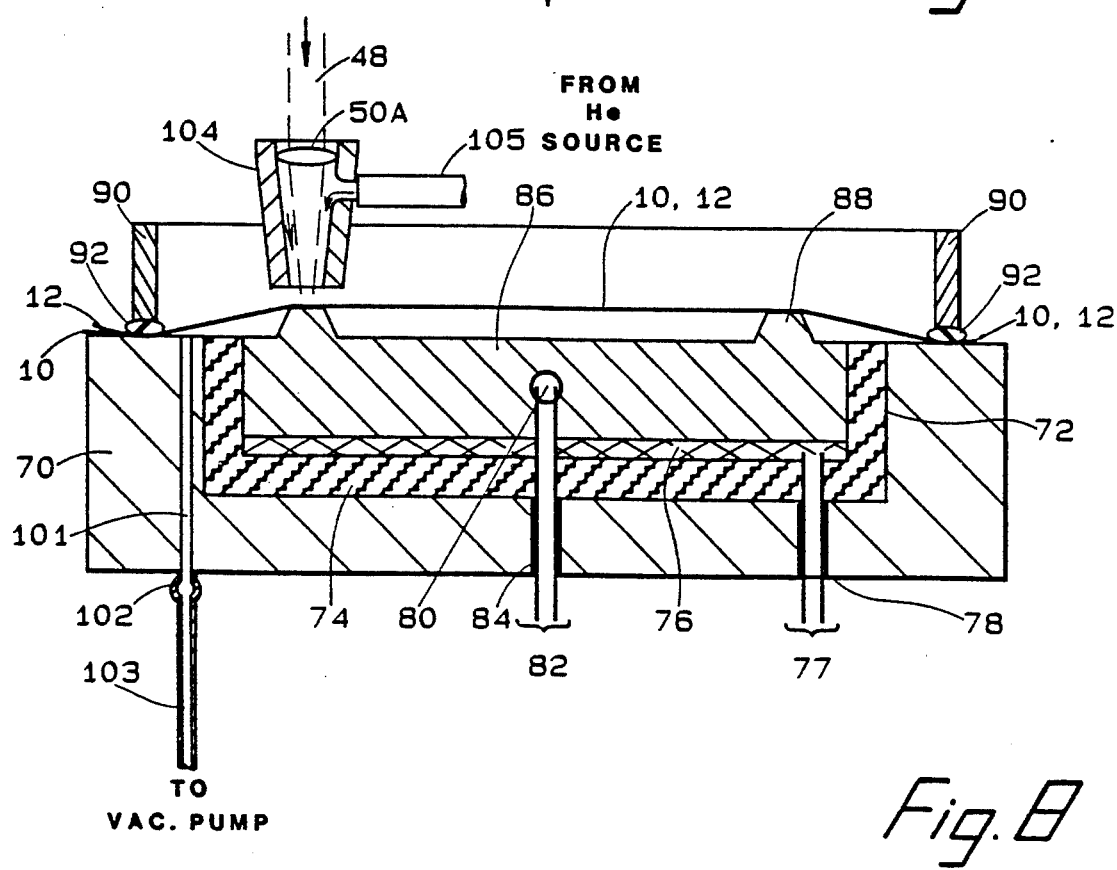
FIG. 8 is a cross-sectional view taken on line 8—8 of FIG. 7.

FIG. 6 also indicates a flow of shielding gas around the cutting and welding site, the means provided to cause this gas flow being shown in FIG. 8. The shielding gas removes heat, and an inert gas such as helium is used. The use of a shielding gas is another optional feature of the invention.

FIG. 6 also illustrates an alternative to the simultaneous cutting and welding provided by the spot 52 and small cutting point 56. The alternative is illustrated by the cutting point 56A. This alternative 56A eliminates the entire apparatus of FIG. 4 since two separate lasers are provided, one to provide the welding zone 52 and the other, indicated by its cutting point 56A, is offset in the direction of production of the cut and welded seams to provide the cutting. This has the advantage of providing simple apparatus to accomplish effectively simultaneous welding and cutting.

Figure 7:
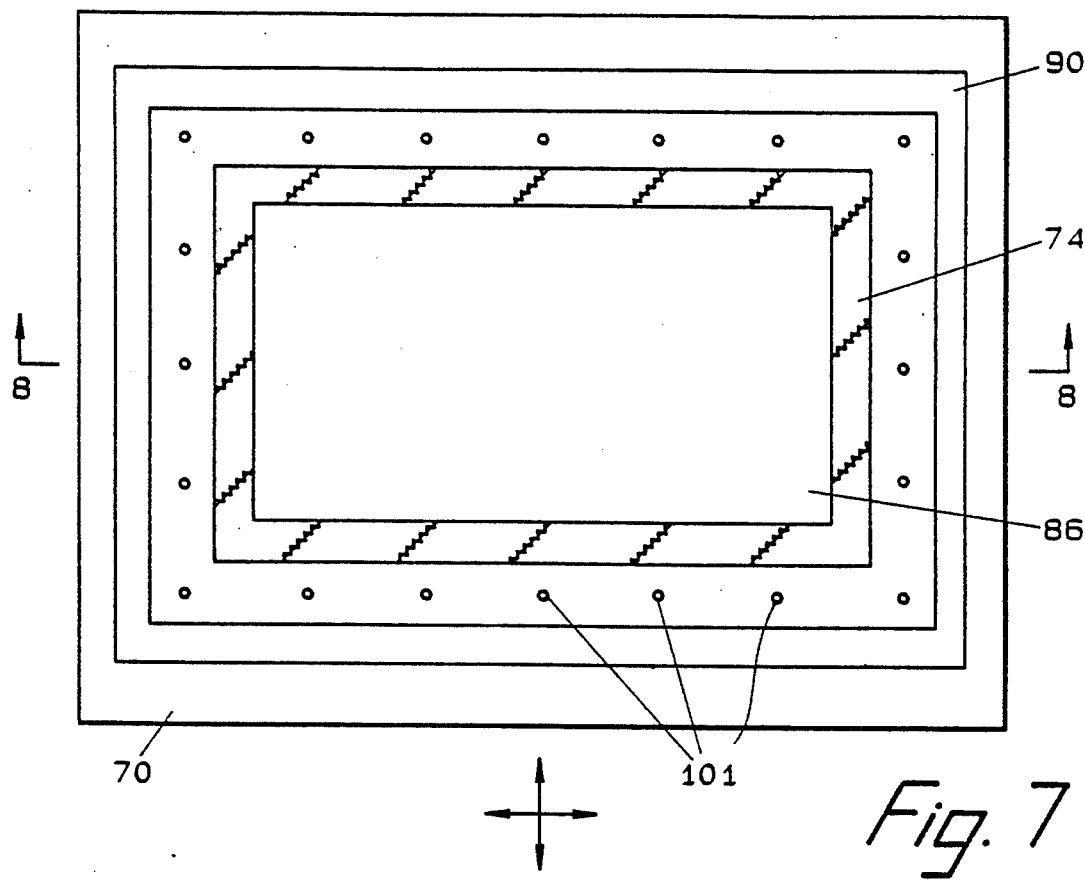
FIG. 7 is a top plan diagrammatic view showing an embodiment of the invention using a heated platen.

In FIGS. 7 and 8 there is shown an embodiment of the invention wherein dies may be used. While in general an advantage of the invention is the avoidance of the use of dies, in certain situations, as for example where large quantities of the same kind of bag or the like are to be made, it may sometimes be an advantage to use a die. The flexibility of the invention includes the possibility of its application to more conventional means such as the use of dies, as well as use without dies as shown in the preceding figures and described above.

Referring now to FIGS. 7 and 8, a table 70 is provided, and this table includes means, preferably computer controlled, to permit its motion in an X-Y plane. The means to cause this motion are indicated diagrammatically on FIGS. 7 and 8 below the drawing in FIG. 7 and to the right in FIG. 8. The table 70 is formed with a cavity 72, and this cavity is lined with thermal insulation 74.

Means are provided to heat and carefully control the temperature of the platen 86 inside the insulation 74. Alternatively, this platen can be used "cold", i.e., at room temperature. To this end there is provided a heater element 76 which is fed electricity through a pair of leads 77 which lead to a power supply not shown. A thermostat 80 on the platen 86 senses the temperature of the platen 86 and feeds this information to the power controller 82. Parts of the control means are indicated diagrammatically in FIG. 8 and described below. Opening 78 for the leads 77 and opening 84 for the leads 82 are provided in the X-Y table 70.

Means is provided for exhausting the air from beneath the films through a plurality of holes 101. All of these holes 101 are connected to a manifold 102 which is connected to a hose 103 which leads to a vacuum pump (not shown). The removal of air from beneath the films 10 and 12 causes to films 10 and 12 to draw down tightly onto the platen 86.

In FIG. 8, the placement of lens 50A and helium nozzle 104 are shown. Helium nozzle 104 is connected via hose 105 to a helium source, not shown. The helium must impinge on the weld zone with sufficient velocity to reduce the surface temperature of upper film 12.

Means are provided to hold the film pair 10/12 in place prior to application of vacuum. To this end, there is provided a frame 90 having a resilient cushion or work holding portion 92 which bears against the table 70 outboard of the platen 86, see FIG. 8. This is also shown schematically in the composite diagrammatic view of FIG. 7. The shape of the frame 90 and presser 92 are made to correspond at least generally to the shape of the finished product as defined by the platen 86. The actual cutting, welding, or cutting and welding is performed by a laser beam 48, which is controlled by a lens 50A, these parts being analogous to the showing of FIG. 4 as described above.

Thus, when heated, platen 86 can become a heated platen. The use of a heated platen can reduce distortion and wrinkling in parts produced by the invention when such parts are later subjected to heating. If the fluorocarbon film is heated and allowed to expand prior to welding, and the heating is maintained during the welding process, then the shrinkage of the weld area relative to the undisturbed material can be substantially reduced. This significantly reduces wrinkling of the bag so produced if the bag is subjected to heating later, for example, if it is sterilized by pressurized steam at 250 degrees F.

Another aspect of the versatility of the invention is that it is possible, using the control means of FIG. 9 as described below, to cause the laser beam or laser beams to move in one of the X and Y directions of this orthogonol system, and to cause the vacuum table or other work holding means to move in the other of the X and Y directions. With this arrangement, it is anticipated that increased speed of production can be achieved.

Figure 9:
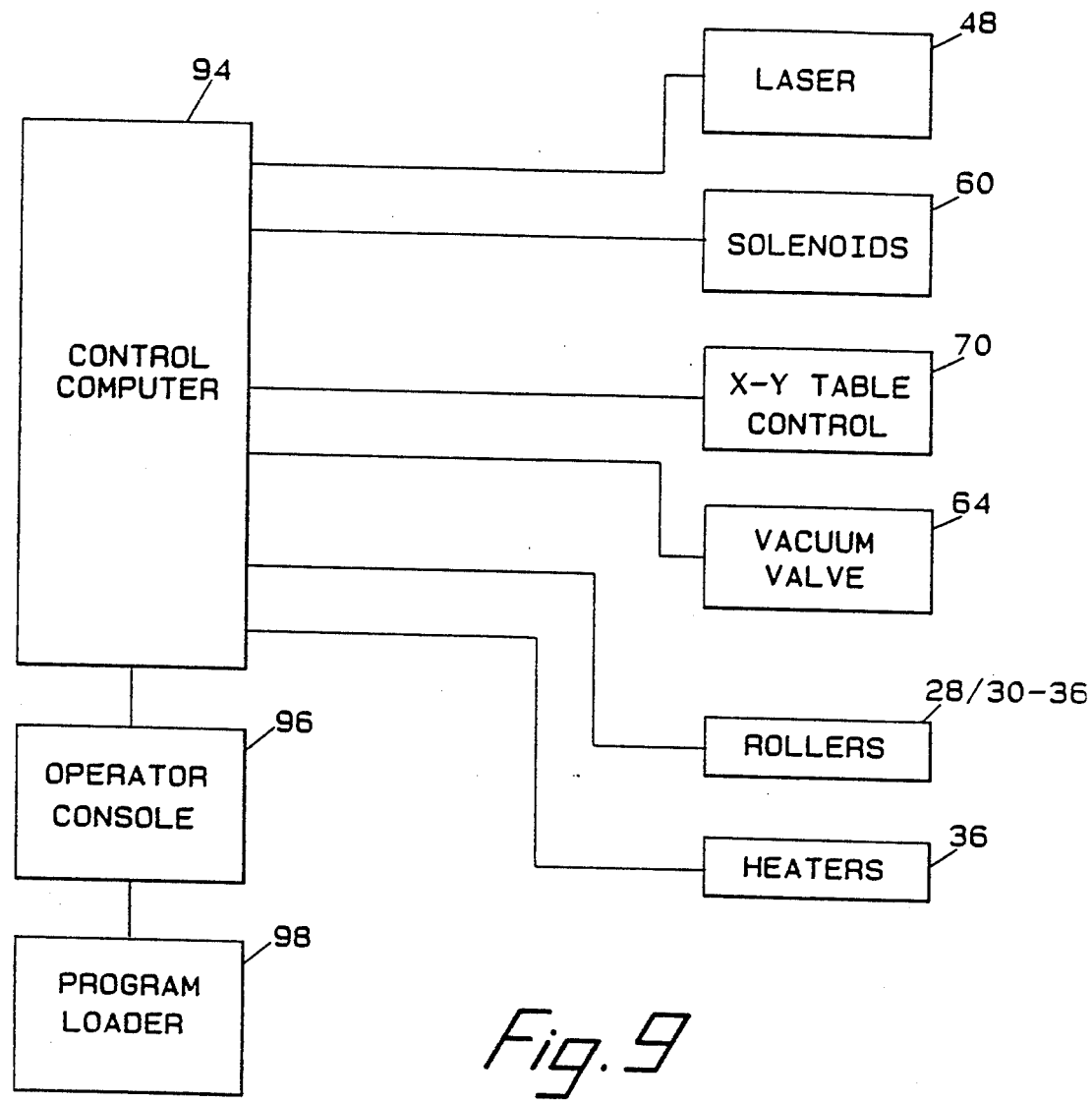
FIG. 9 is a simplified logic block diagram of the control circuitry of the invention.

Referring now to FIG. 9, the control mechanism of the invention is shown diagrammatically. Control is based upon a programmable general purpose digital computer 94, as are easily available. This computer is controlled by a console 96 which in turn receives programming information and the like through a program loader 98.

Most of the various controlled parts of the various embodiments of the invention apparatus are illustrated by the blocks to the right-hand side of FIG. 9, these blocks being labelled with the reference numerals of the associated parts in the preceding Figures and described above. Of course, other parts of the apparatus, or additional parts not described herein, could as well be incorporated with other embodiments of the invention and also controlled by the computer 94 and the control scheme of FIG. 9.

METHOD OF THE INVENTION

The invention methods relate primarily to the manufacture of articles for biomedical use, such as cell culture bags, comprised of first and second fluorocarbon films, each having a preselected thickness and with the overlapping films joined together along their mating edges. The method uses an apparatus for bringing two fluorocarbon films together into "optical contact" (as defined above), such as is shown in FIG. 3. The films 10/12 are kept in a dust free box which is continuously swept with dust free air or other gas such as Nitrogen or Helium and which are irradiated with germicidal lamps or otherwise treated to kill bacteria and to prevent mold growth. Two rolls of the fluorocarbon films are positioned one above the other within the dust free box in preparation for despooling in the presence of a static electricity neutralizer. After despooling, optionally, the upper and lower films each pass through rinse water applicators which rinse the surfaces of the films which are to be brought together into "optical contact" to form the interior of the bag. Following the rinse is an air knife, which directs clean or sterile air at a sufficiently high velocity to remove the water from each of the two films.

After rinsing and drying and without delay, the two fluorocarbon films are pressed together between heated rollers (or rolled against a heated platen) until they make "optical contact" with each other to form a film pair.

This film pair can be shipped, handled and otherwise treated as a single film, can be used immediately or stored indefinitely, and has its own independent utility. This film pair can then be processed using the apparatus of FIGS. 4 and 5 or of FIG. 6 to make the bags of FIG. 2. Alternatively, the film pair can be used to make other products. The independent utility resides in the fact that once produced by the apparatus of FIG. 3 in accordance with the invention method, the film pairs will not delaminate, and will permit substantial and relatively rugged subsequent handling while maintaining the cleanliness and integrity of the optical contact between the films.

The methods of the invention also include directing a laser beam of a wavelength selected where there is substantial absorption of the energy of the laser beam by the films. The beam shape can consist of a defocused ring of laser energy of about 0.25 to about 0.50 inch outside diameter and about 0.125 to about 0.250 inch inside diameter with a concentrated cutting spot of about 0.010 inch diameter in the center. This can be achieved, as shown in FIG. 4, by placing the workpiece closer than the focal point of a converging lens which is the full diameter of the collimated laser beam, and also placing a small converging lens in the center of the beam such that the focal point of the large and small lenses combined occurs at the workpiece, so as to create the concentrated spot. The cut feature can be stopped by placing a shutter over the small converging lens. The shutter can be controlled by a solenoid and used only when needed. Due to the circular shape and thus symmetry of the beam, the workpiece can be advanced in any direction within its plane while still welding and cutting. Other variations, including use of two lasers and an optical wedge which rotates to offset the beam are also available.

Alternately, a beam of about 0.125 to about 0.50 inch diameter can be used to perform the welding, and after welding, the beam can be focused to a spot and the bag or films can be cut in a second operation.

The methods of the invention also include moving the laser beam with respect to the workpiece at a speed sufficient to weld two fluorocarbon films together without cutting them (i.e., melting them through) in the region of the annular ring of energy. As an optional feature, thermal decomposition and overheating can be prevented by using a shield of inert gas such as helium or nitrogen. The beam is defocused to a diameter of about $\frac{1}{8}$ to about $\frac{1}{2}$ inch, and has uniform energy throughout its cross section because of the defocusing. When welding the seams, the gas shielded, defocused laser beam is applied to the film pair, and the beam or the workpiece (film pair) is moved to obtain the desired outline of the weld line.

It is important that the material not to be clamped to a thermally conductive room temperature die as the die would act as a heat sink and prevent formation of a good seam. Since dies are expensive their elimination amounts to a major improvement and permits unlimited flexibility in the dimensions of welded seams.

The film pair can be held in place by use of a vacuum table, see FIG. 6, which provides increased durability in bags which are to be sterilized by heat. When seams are welded, they shrink in their linear dimensions, and therefore the bag wrinkles along the seam when it is subjected to heat sterilization later and is allowed to strain relieve. When the bag is subsequently filled with liquid, the wrinkles are pulled straight by the fluid pressure and create areas of high strain which are prone to leaking. The wrinkling process starts during welding if the bag is allowed to distort. The vacuum hold down table reduces the wrinkling by providing a completely flat bag after welding.

In an alternate method of processing, a cold or a heated platen can be used as shown in FIG. 7, which can be steel, copper alloy, or aluminum alloy and must be heated to 275 to 375 degrees F. during welding. The films, which need not be in optical contact when the platen is used, must be stretched tightly over the platen in order to obtain a good seam.

In use, the work would be held in place by operation of the valve in FIG. 9 for the vacuum table 64 on the table 70. This could be in accordance with the embodiment of FIG. 6 or FIGS. 7 and 8, or any variation thereof. Then the laser 48 is turned on and the operator observes the beam while the table is not moving. If the laser is operating properly and appears satisfactory to the operator, then by use of the console 96 the operator commences to cut, weld, or cut and weld the work held in place by the the vacuum means 64.

While the invention has been described in detail above, it is to be understood that this detailed description is by way of example only, and the scope of protection granted is to be limited only within the spirit of the invention and the scope of the following claims.

What is claimed is:

1. A method of welding two plastic films together, comprising the steps of putting said films into optical contact with each other, and using laser means to weld said films together at locations where laser energy from said laser means strikes said films, said plastic films consisting of fluorocarbon films, and each having physical characteristics different from each other.

2. The method of claim 1, and selecting said laser means to have a wavelength which is absorbed well by the particular plastic of said films.

3. The method of claim 1, and selecting a $CO_2$ laser in said laser means to produce said laser beam, said $CO_2$ laser having a wavelength of 10.6 microns.

4. The method of claim 3, said step of putting said films into optical contact including the application of heat and positive or vacuum pressure to said films during said putting into optical contact step.

5. The method of claim 4, and the step of using heated platen means to heat said films for said putting into optical contact step.

6. The method of claim 4, wherein said films are each in the range of 0.001 inch to 0.010 inch thick, providing rolls of said films, performing said putting into optical contact step continuously by despooling said rolls of said films, heating at least one of said films to about 200 degrees F. and pressing said films into said optical contact with each other continuously.

7. The method of claim 6, and the steps of making bags for medical usage from said films, and washing and removing static electricity from said films prior to performing said steps of heating and pressing said films.

8. The method of claim 6, and the step of removing static electricity from said films prior to performing said steps of heating and pressing said films.

9. The method of claim 1, and using said plastic films to make plastic bags each having a dimension equal to or less than the width of said films, providing rolls of said films so that said putting into optical contact step is performed continuously, and using said laser means to at least substantially simultaneously make a cut across the width of said films while welding said films together on both sides of said cut, whereby one relative motion between said films and said laser means across said width produces one finished edge on each of two adjacent bags being formed of said films while also severing said two adjacent bags from each other.

10. The method of claim 1, and the step of causing said laser means to comprise one laser producing one laser beam, causing said laser beam to have a central spot of relatively intense laser energy and an annular region surrounding said central spot of relatively less intense laser energy, and using control means to cause relative motion between said laser beam and said films to simultaneously cut said films along the path of said central spot and to weld said films on both sides of the cut line along the path of said annular region.

11. A method of welding two plastic films together, comprising the steps of putting said films into optical contact with each other, using laser means to weld said films together at locations where laser energy from said laser means strikes said films, causing said laser means to comprise one laser producing one laser beam, causing said laser beam to have a central spot of relatively intense laser energy and an annular region surrounding said central spot of relatively less intense laser energy, using control means to cause relative motion between said laser beam and said films to simultaneously cut said films along the path of said central spot and to weld said films along the path of said central spot and to weld said films on both sides of the cut line along the path of said annular region, and the optional steps of selectively preventing one of said annular region and said central spot of said laser beam from affecting said films, whereby said laser beam can be used to selectively only cut and not weld said films, and to selectively only weld and not cut said films.

12. The method of claim 11, and the step of using said laser beam in its weld only mode to mark indicia onto said films.

13. The method of claim 1, and the steps of holding said films stationary, and moving said laser means to cause said laser means to trace a predetermined pattern on said films.

14. The method of claim 1, and the steps of holding said laser means stationary, and moving said films to cause said laser means to trace a predetermined pattern on said films.

15. The method of claim 1, and using vacuum table means to hold said films stationary, and using said laser means to cut and weld said films to a predetermined pattern.

16. The method of claim 1, and the step of causing relative motion between said films and said laser means in an X-Y orthogonal system, moving one of said laser means and said films in one of said X and Y directions, and moving the other of said laser means and said films in the other of said X and Y directions.

17. A method of welding two plastic films together, comprising the steps of putting said films into optical contact with each other, using laser means to weld said films together at locations where laser energy from said laser means strikes said films, causing said laser means to comprise a first laser and a second laser, displacing said first laser from said second laser, causing relative motion between said films and said first and second lasers along a line defined by said two lasers, using the one of said lasers to first strike said films to weld said films together and the second of said lasers to cut said films apart along the weld, and performing said cutting and welding in such manners that said films remain welded together on both sides of the line of cut.

18. The method of claim 1, and the step of causing a flow of shielding gas around the location where said laser beam strikes said films, whereby thermal decomposition of said films at said location is prevented.

19. The method of claim 18, wherein said shielding gas is helium.

20. A method of welding two plastic films together, comprising the steps of putting said films into optical contact with each other, using laser means to weld said films together at locations where laser energy from said laser means strikes said films, and controlling the location at which said laser beam strikes said films by deviating said beam away from the optical axis of said laser means, whereby said laser beam can weld said films together at a pre-existing edge of said films.

21. A method of cutting fluorocarbon sheet material comprising the steps of selecting a $CO_2$ laser having a wavelength of 10.6 microns, applying the beam from said laser to said fluorocarbon sheet material, and causing relative motion between said laser beam and said fluorocarbon sheet material.

22. The method of claim 21, and the steps of welding two of said sheets together, putting said sheets into optical contact with each other, and using said laser beam to simultaneously weld said sheets together at locations where said laser beam strikes said sheets.

23. The method of claim 22, said step of putting said fluorocarbon sheets into optical contact including the application of heat and positive or vacuum pressure to said sheets during said putting into optical contact step.

24. The method of claim 23, and the step of using heated platen means to heat said films.

25. The method of claim 23, wherein said sheets are each in the range of 0.001 inch to 0.010 inch thick, providing rolls of said sheets, performing said putting into optical contact step continuously by despooling said rolls of said sheets, heating at least one of said sheets to about 200 degrees F., and pressing said sheets into said optical contact with each other continuously.

26. The method of claim 25, and the steps of making bags for medical usage from said sheets, and washing and removing static electricity from said sheets prior to performing said steps of heating and pressing said sheets.

27. The method of claim 26, and the step of removing static electricity from said sheets prior to performing said steps of heating and pressing said sheets.

28. The method of claim 21, and the step of controlling the location at which said laser beam strikes said sheet material by deviating said beam away from the optical axis of said laser.

29. The method of claim 22, and using two of said fluorocarbon sheets to make plastic bags each having a dimension equal to or less than the width of said sheets, providing rolls of said sheets so that said putting into optical contact step is performed continuously, and using said laser beam to simultaneously make a cut across the width of said sheets while welding said sheets together on both sides of said cut, whereby one relative motion between said sheets and said laser beam across said width produces one finished edge on each of two adjacent bags being formed of said sheets while also simultaneously severing said two adjacent bags from each other.

30. The method of claim 21, causing said beam from said $CO_2$ to have a central spot of relatively intense laser energy and an annular region surrounding said central spot of relatively less intense laser energy, and using control means to cause relative motion between said laser beam and said fluorocarbon sheet material to simultaneously cut said fluorocarbon sheet material along the path of said central spot and to weld said fluorocarbon sheet material on both sides of the cut line along the path of said annular region.

31. The method of claim 30, and the optional steps of selectively preventing one of said annular region and said central spot of said laser beam from effecting said fluorocarbon sheet material, whereby said laser beam can be used to selectively only cut and not weld said fluorocarbon sheet material, and to selectively only weld and not cut said fluorocarbon sheet material.

32. The method of claim 31, and the step of using said laser beam in its weld only mode to mark indicia onto said fluorocarbon sheet material.

33. The method of claim 21, and the steps of holding said fluorocarbon sheet material stationary, and using control means to move said laser beam to cause said laser beam to trace a predetermined pattern on said fluorocarbon sheet material.

34. The method of claim 21, and the steps of holding said laser beam stationary, and moving said fluorocarbon sheet material to cause said laser beam to trace a predetermined pattern on said fluorocarbon sheet material.

35. The method of claim 21, and using vacuum table means to hold said fluorocarbon sheet material stationary during said step of causing relative motion, whereby said laser beam cuts and welds said fluorocarbon sheet material to a predetermined pattern without the use of a die.

36. The method of claim 21, and the steps of causing relative motion between said sheet material and said laser in an X-Y orthogonal system, moving one of said laser and said sheet material in one of said X and Y directions, and moving the other of said laser and said sheet material in the other of said X and Y directions.

37. The method of claim 21, and the step of causing a flow of shielding gas around the location where said laser beam strikes said fluorocarbon sheet material, whereby thermal decomposition of said fluorocarbon sheet material at said location is prevented.

38. The method of claim 37, wherein said shielding gas is helium.

39. A method of using a laser beam to cut and weld two plastic films simultaneously comprising the steps of forming said laser beam into an relative intense central spot surrounded by an annular region of less intense laser energy, using control means to cause relative motion between said laser beam and said films to simultaneously cut said films along the path of said central spot and to weld said films on both sides of the cut line along the path of said annular region on said films, and putting said films into optical contact with each other, said films consisting of fluorocarbons, and each of said films having physical characteristics different from those of the companion film.

40. The method of claim 39, and selecting said laser to have a wavelength which is absorbed well by the particular plastic of said films.

41. The method of claim 39, and selecting a $CO_2$ laser to produce said laser beam, said laser having a wavelength of 10.6 microns.

42. The method of claim 41, said step of putting said fluorocarbon films into optical contact including the application of heat and positive or vacuum pressure to said films during said putting into optical contact step.

43. The method of claim 42, and using heated platen means to heat said films during said application of heat step.

44. The method of claim 42, wherein said films are each in the range of 0.001 inch to 0.010 inch thick, providing rolls of said films, performing said putting into optical contact step continuously by despooling said rolls of said films, heating at least one of said films to about 200 degrees F. and pressing said films into said optical contact with each other continuously.

45. The method of claim 44, and the steps of making bags for medical usage from said films, and washing and removing static electricity from said films prior to performing said steps of heating and pressing said films.

46. The method of claim 44, and the step of removing static electricity from said films prior to performing said steps of heating and pressing said films.

47. The method of claim 39, and using said plastic films to make plastic bags each having a dimension equal to or less than the width of said films, providing rolls of said films so that said putting into optical contact step is performed continuously, and using said laser beam to simultaneously make a cut across the width of said films while welding said films together on both sides of said cut, whereby one relative motion between said films and said laser beam across said width produces one finished edge of each of two adjacent bags being formed of said films while also simultaneously severing said two adjacent bags from each other.

48. The method of claim 39, and the steps of holding said films stationary, and moving said laser beam using said control means to cause said laser beam to trace a predetermined pattern on said films.

49. The method of claim 39, and the steps of holding said laser beam stationary, and moving said films using said control means to cause said laser beam to trace a predetermined pattern on said films.

50. The method of claim 39, and using vacuum table means to hold said films stationary during said step of causing relative motion, whereby said laser beam cuts and welds said films to a predetermined pattern without the use of a die.

51. The method of claim 39, and the step of controlling the location at which said laser beam strikes said films by deviating said beam away from the optical axis of the means producing said laser beam, whereby said laser beam can weld said films together at a pre-existing edge of said films.

52. The method of claim 39, and said step of causing relative motion between said films and said laser means occurring in an X-Y orthogonal system, moving one of said laser beam and said films in one of said X and Y directions, and moving the other of said laser beam and said films in the other of said X and Y directions.

53. A method of using a laser beam to cut and weld two plastic films simultaneously comprising the steps of forming said laser beam into a relatively intense central spot surrounded by an annular region of less intense laser energy, using control means to cause relative motion between said laser beam and said films to simultaneously cut said films along the path of said central spot and to weld said films on both sides of the cut line along the path of said annular region on said films, and the optional steps of selectively preventing one of said annular region and said central spot of said laser beam from affecting said films, whereby said laser beam can be used to selectively only cut and not weld said films, and to selectively only weld and not cut said films.

54. The method of claim 53, and the step of using said laser beam in its weld only mode to mark indicia onto said films.

55. The method of claim 39, and the step of causing a flow of shielding gas around the location where said laser beam strikes said films, whereby thermal decomposition of said films at said location is prevented.

56. The method of claim 55, wherein said shielding gas is helium.

* * * * *